United States Patent Office 3,052,734
Patented Sept. 4, 1962

3,052,734
HALOGENATED AROMATIC HYDROCARBONS STABILIZED WITH POLYACETYLENIC HYDROCARBONS
Bobby F. Adams, Painesville, and John H. Wotiz, Mentor, Ohio, assignors to Diamond Alkali Company, Cleveland, Ohio, a corporation of Delaware
No Drawing. Filed Oct. 27, 1958, Ser. No. 769,583
8 Claims. (Cl. 260—651)

The present invention relates to polyacetylenic hydrocarbons, such as linear alpha, omega polyacetylenic and cyclic acetylenic hydrocarbons prepared by chemically reacting a compound containing the linkage —C≡C— and an alkylene dihalide, and to methods of preparing and using these compounds.

The present invention more specifically relates to alpha, omega polyacetylenic hydrocarbons, e.g., alpha, omega triacetylenic and alpha, omega tetraacetylenic hydrocarbons, which may be represented by the structure:

(I)     HC≡C—R$_1$[C≡C—R$_2$]$_n$C≡CH wherein $n$ is a number equal to or greater than 1, e.g., a number from 1 to about 15 inclusive, $R_1$ and $R_2$ are alkylene radicals having from 2 to about 15 carbon atoms, e.g., polymethylene and branch chain polymethylene radicals, such as ethylene, trimethylene, tetramethylene, pentamethylene, heptamethylene, propylene, butylene, and the like.

The term "alkylene radicals" as employed in the specification and claims, unless otherwise defined, is intended to refer broadly to organic hydrocarbon radicals having the general formula —C$_m$H$_{2m}$—, $m$ being a number from 1 to about 50 inclusive, e.g., 1 to 20, which radicals may be either straight chain or branched chain, e.g., those having 2 to 15 carbon atoms. Specific examples of "alkylene radicals" are those having 5 carbon atoms:

—CH$_2$—CH$_2$—CH$_2$—CH$_2$—CH$_2$—

—CH$_2$—CH$_2$—CH—CH$_2$—
             |
             CH$_3$

—CH$_2$—CH—CH—
        |    |
       CH$_3$ CH$_3$

—CH—CH—
   |    |
  CH$_3$ CH$_2$—CH$_3$

—CH$_2$—CH—CH$_2$—
        |
      CH$_2$—CH$_3$

The invention further relates to a novel cyclic acetylenically unsaturated hydrocarbon which may be represented by the structure:

(II)
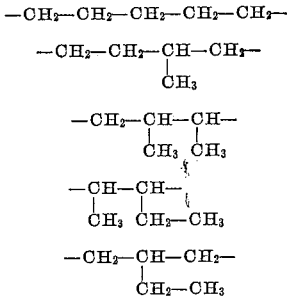

wherein $n$ is a number equal to or greater than 1, e.g., a number from 1 to about 15, $R_3$ and $R_4$ are alkylene radicals having at least 5 carbon atoms.

Moreover, the present invention relates to pesticidal compositions containing the acetylenic hydrocarbons of this invention and to methods of killing pests employing these compositions.

Still further the compounds of this invention are useful in the inhibition of decomposition of a halogenated aromatic hydrocarbon. In this application it has been found that decomposition of a halogenated hydrocarbon, e.g., a chlorinated xylene, may be prevented by the addition thereto of a stabilizing amount of a compound according to the structure:

(III)     HC≡C—R$_5$[C≡C—R$_6$]$_n$C≡CH wherein $n$ is a number equal to or greater than 1, e.g., a number from 1 to about 15 inclusive, $R_5$ and $R_6$ are alkylene radicals having greater than 4 carbon atoms, e.g., 1,8,15-hexadecatriyne. It has also been found that compounds within the scope of structure II are particularly useful in the stabilization of benzyl chloride, the preferred compound in this application being 1,8-cyclotetradecadiyne.

It is known that a chlorinated xylene in a pure condition may be stored or shipped with little or no decomposition induced by exposure to air, light, heat and/or moisture. However, in many instances obtaining such high purity chlorinated xylene in commercial production is not feasible. It has been found that the chlorinated xylenes normally encountered in commerce are subject to some degree of decomposition when in contact with substances such as specks of rust or aluminum, dirt, air, light, heat, moisture and the like. Hence, means for preventing and/ or inhibiting this decomposition of chlorinated xylenes and/or other chlorinated aromatic hydrocarbons generally associated therewith are highly desirable.

Previously various stabilizers for aliphatic chlorinated hydrocarbons have been employed. Some of these compounds which have demonstrated a degree of effectiveness are acetylenic alcohols, acetylenic ethers, straight chain acetylenic esters, monoacetylenic hydrocarbons and monoacetylenic monoolefinic hydrocarbons. Although these prior stabilizers enjoyed a certain amount of success, surprisingly, such materials are not satisfactory for the stabilization of chlorinated xylenes and specifically alpha-chloro-p-xylenes for various reasons. Acetylenic alcohols are highly effective for the stabilization of such chlorinated aliphatic hydrocarbons as perchlorethylene but are ineffective for the stabilization of chlorinated xylenes such as alpha-chloro-p-xylenes in that significant decomposition occurs even though the alpha-chloro-p-xylene contains relatively large quantities of these compounds. Monoacetylenic monoolefinic hydrocarbons and straight chain acetylenic esters are unsatisfactory for the same reason.

In view of the fact that the above acetylenically unsaturated general stabilizers employed are unsatisfactory it would lead to the conclusion that the compositions employed in the stabilization of chlorinated xylenes and the method of stabilizing such compounds are highly selective and, therefore, those stabilizers employed previously in the stabilization of chlorinated aliphatic hydrocarbons, such as carbon tetrachloride, perchlorethylene, tetrachlorethylene and the like, are not adaptable to the stabilization of chlorinated xylenes. This is emphasized by the fact that although 1,8-cyclotetradecadiyne is useful as a stabilizer for benzyl chloride, it is not applicable to the stabilization of alpha-chloro-p-xylene.

Unstabilized quantities of halogenated aromatic hydrocarbons as produced, including such compounds as alphachloro-p-xylene and benzyl chloride, may be either in a relatively pure or impure condition. For the most part the purity of such a halogenated aromatic hydrocarbon depends upon its age, i.e., the length of time it has stood unstabilized after production without particular efforts being made to prevent the decomposition. Accordingly, a relatively impure halo aromatic hydrocarbon is found to be of limited utility for many industrial needs although further decomposition may be inhibited by using the stabilizers of the present invention. On the other hand, some unstabilized halo aromatic hydrocarbons are employed while relatively fresh and are correspondingly pure and usable. Such materials require only stabilization against further decomposition in order to be satisfactory for a number of uses.

Where the initial purity is not tolerable the chlorinated aromatic hydrocarbon may require pretreatment of a nature such that the major proportion or substantially all of the impurities are removed prior to the addition of stabilizers so as to provide a material having a good initial level of acceptability for industrial needs. As noted above, some chlorinated aromatic hydrocarbons may not require such pretreatment although those skilled in the art will understand that a chlorinated xylene containing undesirable impurities may advantageously be treated for the removal or reduction of any impurities prior to stabilization. Such purification may be effected through means common in the art, such as distillation.

In general, the present invention is directed to a composition comprising essentially a chlorinated aromatic hydrocarbon, e.g., a normally liquid chlorinated xylene, such as alpha-chloro-p-xylene and a stabilizing amount of at least one polyacetylenic hydrocarbon, i.e., triacetylenic hydrocarbon and tetraacetylenic hydrocarbon, preferably 1,8,15-hexadecatriyne.

Further, the present invention is directed to a composition comprising essentially benzyl chloride and a stabilizing amount of at least one cyclic acetylenic hydrocarbon, e.g., 1,8-cyclotetradecadiyne.

Further, the invention is directed to such a composition including an additional ingredient effective to exert a stabilizing action against the influence of light and other sources of decomposition. This is intended to include other stabilizers which may be combined with the stabilizers of the present invention which cause a synergistic effect concerning the stabilization of halogenated aromatic hydrocarbons. Typical stabilizer combinations of 1,8,15-hexadecatriyne and bis-(2-propynyl)-2,3,5,6-tetrachloroterephthalate, 1,8,15-hexadecatriyne and sorbitol, and 1,8-cyclotetradecadiyne and ethylene glycol. It will be understood the invention is not limited to a particular light, heat, or other stabilizers, and that, in general, any well-known light or other stabilizer may be employed with the general purpose stabilizers of this invention.

As stated, a new class of stabilizers noted above, namely, alpha, omega tri- and tetraacetylenic hydrocarbons have been found particularly effective in stabilizing alpha-chloro-p-xylene contaminated with minor amounts of metallic ions, such as those produced by specks of rust or aluminum, both in a liquid or in a vapor phase. For the most part, the stabilizing effect has been found to be most pronounced and prolonged where pretreatment which removes the greater part of contaminating metallic ions has been resorted to prior to the addition of the stabilizing alpha, omega tri- or tetraacetylenic hydrocarbon.

The method of stabilizing halogenated aromatic hydrocarbons, i.e., chlorinated aromatic hydrocarbons, in accordance with this invention comprises essentially contacting a major proportion of the halogenated aromatic hydrocarbons, i.e., the chlorinated xylenes or benzyl chloride, with a stabilizing amount of the alpha, omega polyacetylenic hydrocarbon or the polycycloacetylenic hydrocarbon, respectively. It is preferred that the stabilizer be added after the initial preparation of the halogenated hydrocarbon, i.e., after the chlorination step, and that the stabilizing amount of the respective stabilizers be combined, as noted above, e.g., in an amount of about 0.0001% to 5% by weight of the halogenated aromatic hydrocarbon, preferably, however, from about 0.1% to 1% by weight of the chlorinated aromatic hydrocarbon. Under more adverse conditions, such as higher temperatures and/or excessive contamination, it may be necessary to add several percent of the stabilizer. Large quantities of the stabilizer are seldom necessary or desirable and in most cases amounts of stabilizer less than 5% by weight of the halogenated aromatic hydrocarbon protect the halogenated compound against the decomposition under the most severe conditions normally encountered. The indicated intermediate preferred range is generally sufficiently effective for the purified halogenated aromatic hydrocarbon containing not more than 0.2% by weight of the metallic impurities most common in commercial production.

Illustrative novel acetylenic hydrocarbons of this invention are alpha, omega triacetylenic hydrocarbons which may be represented by the structure:

(IV) 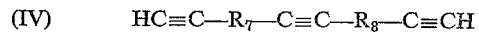

wherein $R_7$ and $R_8$ are alkylene radicals having 2 to about 50 carbon atoms inclusive. Specific triacetylenic hydrocarbons within this structure are:

1,9,17-octadecatriyne
1,8,15-hexadecatriyne
1,7,13-tetradecatriyne
1,6,11-dodecatriyne Further specific compounds of this invention are alpha, omega tetraacetylenic hydrocarbons which may be represented by the structure:

(V) 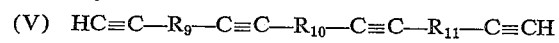

wherein $R_9$, $R_{10}$, and $R_{11}$ are alkylene radicals having from 2 to about 50 carbon atoms, inclusive. Specific tetraacetylenic hydrocarbons within structure V are:

1,7,13,19-eicosatetrayne
1,8,15,22-tricosatetrayne
1,9,17,25-hexacosatetrayne
1,10,19,28-nonacosatetrayne Still more specifically, preferred novel cyclic acetylenic hydrocarbons within the scope of this invention may be represented by the structure:

(VI) 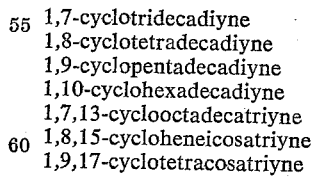

wherein $R_{12}$ and $R_{13}$ are alkylene radicals having at least 5 carbon atoms, e.g., 5 to 50 carbon atoms. Specific cyclic acetylenic hydrocarbons within the scope of the structure II are:

1,7-cyclotridecadiyne
1,8-cyclotetradecadiyne
1,9-cyclopentadecadiyne
1,10-cyclohexadecadiyne
1,7,13-cyclooctadecatriyne
1,8,15-cycloheneicosatriyne
1,9,17-cyclotetracosatriyne The polyacetylenic hydrocarbons within the scope of this invention may be prepared by chemically reacting a compound producing the linkage —C≡C—, e.g., disodium acetylide, with an alkylene dihalide represented by the structure:

(VII) $\quad X_1-R_1-X_1$ wherein $X_1$ is halogen, i.e., fluorine, chlorine, bromine, and iodine, bromine being preferred; $R_1$ is an alkylene radical having from 2 to about 50 carbon atoms, inclusive.

The term "compound producing the linkage —C≡C—" is intended to refer to compounds which produce the atoms —C≡C— in the reaction system necessary to produce compounds of structures I and II. Although the preferred compounds of this type are dialkali metal acetylides, such as disodium, dilithium and dipotassium acetylides, the term is not to be so limited since it is intended to refer broadly to compounds both containing and producing the —C≡C— linkage, e.g., alkaline earth acetylides such as calcium, barium, strontium, beryllium and magnesium acetylides.

The dialkali metal acetylide may be prepared by any convenient method in this application. The following empirical equations give known methods of the preparation of this compound, any one of these preparations being satisfactory for the initial step of preparing the desired acetylenic hydrocarbons:

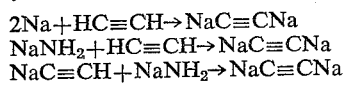

A discussion of the preparation of disodium acetylide, sodium amide, and of the above reactions may be found in Inorganic Synthesis, vol. 2, Editor-in-Chief W. Conrad Fernelius, the McGraw-Hill Book Company, Inc., New York (1946), pages 75 and following.

The desired acetylenic hydrocarbons of this invention may be prepared by chemically reacting separated dialkali metal acetylide and the above alkylene dihalide of structure VII or they may be prepared in situ in the initial preparation of the disodium acetylide. That is, the sodium and acetylene may be reacted in the presence of ammonia followed by the addition of the alkylene dihalide, preferably in the same reaction zone.

As stated, the disodium acetylide may be prepared in a reaction zone separate from the reaction zone in which the disodium acetylide is reacted with the alkylene dihalide. Exemplary of this is the preparation of compounds within the scope of structures I and II, wherein 2 moles of the disodium acetylide previously prepared in a separate reaction zone is reacted with 1 to 3 moles of the alkylene dihalide. These reactants are combined in essentially stoichiometric ratios; however, considerable departure from these ratios may be tolerated, such as up to about 10–15% departure from these ratios, without serious detriment to either quality of product or yield. This reaction is typically carried out in liquid ammonia as solvent, but other solvents which may be employed are butylamine, ethylenediamine, triethylamine, tetrahydrofuran, dimethylether of diethylene glycol, dimethyl ether, and dioxane. The reaction temperature is dictated by the solvent employed; however, a temperature of —30° to —35° C. is typical when employing liquid ammonia. The reaction occurs in a period of about 1 to 48 hours, typically 1 to 24 hours, the desired polyacetylenic hydrocarbons being isolated upon reaction completion by adding water or other proton donor solvents, e.g., alcohols such as methanol, ethanol, propanol, butanol and isopropanol and acids such as Lewis acids, i.e., those discussed specifically in Noller's Chemistry of Organic Compounds, pages 233 through 235, to the reaction mixture followed by filtering, crystallizing, and/or distilling, preferably at reduced pressure.

Polyacetylenic hydrocarbons represented by structures I and II also may be prepared in the same reaction zone as that employed in the preparation of disodium acetylide. That is, the following reactions may be carried out in the same reactor:

(1)    2Na+2NH₃→2NaNH₂+H₂

(2)    2NaNH₂+HC≡CH→NaC≡CNa+2NH₃

(3)    NaC≡CNa+XRX→Compounds I and II wherein XRX is compound VII, defined previously. Although liquid ammonia is the preferred solvent for these reactants, other organic solvents, such as amines, e.g., butylamine, ethylenediamine, triethylamine and diethylamine, tetrahydrofuran, and ethers such as dimethyl ether, diethyl ether, dimethylether of diethylene glycol and dioxane may be employed. The reactants are mixed in the respective numerical order enumerated in the above equations at a temperature dictated by the solvent employed, but typically at a temperature of about —50° C. to 100° C., i.e., —35° to +25° C. Normally stoichiometric quantities of the starting materials are employed, however an excess of NH₃ when employed as solvent may be desirable. The reaction is typically carried to completion over a period of about 3 to 36 hours. Isolation of the product may be carried out by means common in the art, such as recrystallization from an organic solvent, e.g., petroleum ether, methanol, diethyl ether, benzene, ethanol, propanol and the like; the desired product may also be isolated through distillation typically at reduced pressure or through either liquid or vapor phase chromatography.

Specific preparations involving the generic preparation comprising the reaction of disodium acetylide and an alkylene dihalide are the preparations of compounds of structures IV and V above. Although the preferred preparation of these compounds IV and V comprise chemically reacting disodium acetylide and an alkylene dihalide, the disodium acetylide being prepared in the same reaction zone, these reactants may be prepared and combined in separate reaction zones, i.e., the disodium acetylide may be prepared in a reaction zone separate from that incorporated in the reaction of disodium acetylide and the alkylene dihalide. Specific reaction conditions in the preparation of alpha, omega tri- and tetraacetylenic hydrocarbons are as follows: 2000 to 5000 parts by weight of liquid ammonia is mixed with 1 to 10 parts by weight of a catalyst, i.e., ferric nitrate, iron oxide, and sodium peroxide; followed by the addition of 50 to 100 parts by weight sodium metal forming sodium amide, 50 to 100 parts by weight of acetylene gas is then added to this mixture. 2 to 4 moles of an alkylene dihalide of structure VII above is added at a rate sufficient to retain gentle refluxing ammonia. Upon reaction completion 100 to 2000 parts by weight of water is added slowly to the reactant mixture with agitation. The desired product is isolated by recrystallization from an organic solvent, such as petroleum ether, methanol, ethanol, propanol, diethyl ether or benzene, the resultant product being further distilled at reduced pressure yielding the desired tri- and tetraacetylenically unsaturated compounds.

Compounds within the scope of structures II and VI above may be prepared by chemically reacting a dialkali metal acetylide and an alkylene dihalide under essentially the same reaction conditions given in the preparation of a linear alpha, omega polyacetylenic hydrocarbon; that is, the cyclic hydrocarbon may be and is normally prepared as a by-product in the preparation of the linear hydrocarbons. The formation of this cyclic hydrocarbon is enhanced by increased dilution of the initial starting materials, a typical dilution ratio being 4000 to 8000 parts by weight solvent, 70 to 150 parts by weight disodium acetylide, and 1 to 2 moles of alkylene dihalide.

The preferred preparation, i.e., the preparation of compounds within the scope of structures I and II above, is the reaction of disodium acetylide, prepared either in the same reaction zone or in a different reaction zone, with a polymethylene dibromide, this reaction taking place in the presence of a solvent, typically liquid ammonia, under the same reaction conditions given previously in the preparation of a compound within structure I.

The novel polyacetylenic hydrocarbons of this invention comprise products which are useful as chemical intermediates as in the preparation of ethylenically bonded compounds and exhibit biological activity in addition to applications in the field of chlorinated aromatic hydrocarbon stabilization. More specifically, these compounds are active insecticides, fungicides, herbicides and nematocides.

While compounds of this invention may be employed in a variety of applications, biologically active or otherwise, when employed as biologically active materials it will be understood, of course, that such compounds may be utilized in diverse formulations both liquid and solid including finely-divided powders and granular materials as well as liquids such as solution, concentrates, emulsifiable concentrates, slurries and the like, depending upon the application intended and the formulation media desired.

These compounds may be used alone or in combination with other known biologically active materials such as other acetylenically unsaturated compounds, organic phosphate pesticides, chlorinated hydrocarbon insecticides, foliage and soil fungicides, and the like.

Thus, it will be appreciated that compounds of this invention may be employed to form biologically active substances containing such compounds as essential active ingredients which compositions may also include finely-divided dry or liquid carriers, extenders, fillers, conditioners, including various clays, such as talc, spent catalyst, alumina silica materials, liquids, solvents, diluents or the like, including water and various organic liquids such as benzene, toluene, chlorinated benzene, acetone, cyclohexanone, chlorinated xylene, carbon tetrachloride, ethylene dichloride, tetrachloroethylene, carbon disulfide, and alcohols at various temperatures thereof.

When liquid formulations are employed or dry materials prepared which are to be used in liquid form, it is desirable in certain instances additionally to employ a wetting, emulsifying or dispersing agent to facilitate use of the formulation, e.g., Triton X–155 (alkyl aryl polyether alcohol, U.S. Patent 2,504,064). Other suitable surface active agents may be found in an article by John W. McCutcheon, in Soap and Chemical Specialties, vol. 4, Nos. 7–10 (1955).

The term "carrier" as employed in the specification and claims is intended to refer broadly to materials constituting a major proportion of a biologically active or other formulation and hence, includes finely-divided materials both liquids and solids, as aforementioned conveniently used in such applications.

Other applications and uses will be apparent to those skilled in the art in view of the following specific examples. These examples are offered in order that those skilled in the art may more completely understand the present invention and the preferred methods by which the same may be carried into effect.

EXAMPLE 1

*Preparation of 1,8-Cyclotetradecadiyne*

2.5 liters of liquid ammonia is placed in a flask, followed by the addition of 1.35 g. of ferric nitrate hydrate (0.3 g. for each g. atom of sodium employed). 2.0 g. of sodium metal is then added and activated by bubbling dry air into the mixture. 103.5 g. (4.4 mol) of sodium metal is added in small portions and 54.3 liters (2.2 mol) of acetylene gas at 28° C. and 747 mm. mercury pressure is bubbled into the suspension of the sodium amide and 500 g. (2.2 mol) of pentamethylene dibromide is added at a fast dropwise rate sufficient to retain gentle refluxing ammonia. Upon completion of addition of the dibromide, agitation of the mixture is increased to wash down the splattered material on the sides of the reaction flask. The reaction is then stopped and the openings of the reaction vessel covered with polyvinyl chloride film, the reaction mixture being allowed to stand overnight. The reaction mixture is then agitated while water is added slowly with caution. The pressure is allowed to vent by loosening the plastic sheets covering the reaction vessel opening. Upon addition of about 400 ml. of water, the reaction vessel walls are washed by increasing the agitation. The resultant gummy solid is found to be soluble in organic solvents, i.e., pentane and ether. Isolation of the desired acetylenic cyclic hydrocarbon is accomplished by recrystallization from ether, yielding not only the cyclic hydrocarbon but also the respective tri- and tetra-acetylenically unsaturated compounds as by-products. The crude product is further vacuum distilled and recrystallized from ether, yielding the desired product melting at 99° to 100° C. This $C_{14}H_{20}$, having a molecular weight of 188.3, is indicated by the following elemental analytical data:

| Element | Actual, percent by weight | Calculated, percent by weight |
| --- | --- | --- |
| C | 89.6 | 89.3 |
| H | 10.6 | 10.7 |

Infrared spectra indicate the presence of internal acetylenic linkage and the absence of terminal acetylenic linkage; in addition, the compound is insoluble in water and soluble in acetone, cyclohexanone and xylene.

EXAMPLE 2

The procedure given in Example 1 is carried out separating the 1,8,15-hexadecatriyne distilling at 110° to 115° C. at .7 to 1.0 mm. mercury pressure. This triacetylenic hydrocarbon has a refractive index at 25° C. of $n_D^{25}$ 1.4774, this $C_{16}H_{22}$ being indicated by the following elemental analytical data:

| Element | Actual, percent by weight | Calculated, percent by weight |
| --- | --- | --- |
| H | 10.3 | 10.3 |

Infrared spectra also indicates the desired product.

EXAMPLE 3

*Preparation of 1,7,13-Tetradecatriyne and 1,7,13,19-Eicosatetrayne*

Into a flask equipped with cooling means, stirrer, and condenser, about 2½ to 3 liters of anhydrous liquid ammonia, 1.8 g. of ferric nitrate hydrate is added to the mixture with stirring, followed by the addition of 2 g. of sodium metal, and then dry air is bubbled into the mixture for about 30 seconds to activate the catalyst. Then 137 g. of sodium is added at a rate which causes a brisk evolution of hydrogen. When no further hydrogen is evolved the stirrer is speeded up to wash the flask walls free of spattered sodium. Acetylene is then added to the mixture until the milky suspension begins to clear, typically about ½ to 2 hours. 648 g. (3.0 mols) of tetramethylene dibromide is then added at a rate to retain a gentle reflux of liquid ammonia. Upon reaction completion, the ammonia is allowed to evaporate. About 200 to 300 mls. of water is then added with caution and the two layers formed, i.e., the organic layer and aqueous layer, are extracted several times with 100 ml. portions of ether. The combined ether extracts are washed with dilute hydrogen chloride and dilute sodium carbonate aqueous solutions and dried over calcium sulfate. Ether is then removed through distillation. The resultant product is distilled with 1,7,13-tetradecatriyne, $C_{14}H_{18}$, boiling at 111° to 112° C. at 1.0 mm. mercury pressure and an additional product 1,7,13,19-eicosatetrayne, $C_{20}H_{26}$, boiling at 165° to 170° C. at 0.3 mm. mercury pressure. The above triyne is indicated by the following elemental analytical data:

| Element | Actual, percent by weight | Calculated, percent by weight |
| --- | --- | --- |
| C | 89.2 | 90.2 |
| H | 9.6 | 9.8 |
| Molecular Weight | 188 | 186 |

The above tetrayne is also indicated by the following elemental analytical data:

| Element | Actual, percent by weight | Calculated, percent by weight |
| --- | --- | --- |
| C | 89.3 | 90.2 |
| H | 9.8 | 9.8 |
| Molecular Weight | 276 | 266 |

Other higher poly-ynes are also formed as by-products of the above reaction. The desired products are also indicated by infrared spectra.

EXAMPLE 4

To evaluate insecticidal activity of 1,7,13,19-eicosatetrayne, i.e., on the products of Example 1, a test is carried out whereby adult two-spotted spider mites, *Tetranychus bimaculatus,* maintained on Tendergreen beans under controlled conditions are transferred from a stock culture by leaf cuttings to uninfested leaves of bean plants in 2½ inch pots the day prior to testing. Formulation of 1,7,13,19-eicosatetrayne (2000 p.p.m. 1,7,13,19-eicosatetrayne—5% acetone—0.01% Triton X-155—balance water) is sprayed onto the infested test plants. Counts are made after two days demonstrating 100% insect mortality.

EXAMPLE 5

To further demonstrate insecticidal activity of 1,7,13,19-eicosatetrayne, fourth instar larvae of the Mexican bean beetle, *Epilachna varivestis,* less than one day old within the instar, are employed. Paired seed leaves, excised from Tendergreen bean plants, are dipped in a formulation of the test chemical (2000 p.p.m. 1,7,13,19-eicosatetrayne—5% acetone—0.01% Triton X-155—balance water) until they are thoroughly wetted. The chemical deposit on the leaf is then dried and the paired leaves are separated. Each is placed in a 9 cm. Petri dish with a filter paper liner, and ten randomly selected larvae are introduced before the dish is closed. After three days exposure, 100% mortality is observed.

EXAMPLE 6

In order to evaluate insecticidal activity of the compounds of this invention, male German cockroaches, *Blattella germanica,* 8 to 9 weeks old, are anaesthetized with carbon dioxide to facilitate handling and then dipped in a test formulation (2000 p.p.m. test chemical—5% acetone—0.01% Triton X-155—balance water) for 10 seconds, removed and freed of excess liquid, and caged. Two lots of 10 insects each are exposed to this formulation and mortality observations are recorded after three days. Using this procedure, the following mortality ratings are observed:

TABLE I

| Compound | Percent Roach Mortality at 2,000 p.p.m. |
| --- | --- |
| 1,8,15-hexadecatriyne (Product of Example 2) | >50 |
| 1,7,13,19-eicosatetrayne (Product of Example 3) | 100 |
| 1,7,13-tetradecatriyne (Product of Example 3) | 100 |

EXAMPLE 7

Insecticidal utility of 1,7,13,19-eicosatetrayne, i.e., one of the products of Example 3, is shown in the following test. The bean aphid, *Aphis fabae,* is cultured on nasturtium plants. No attempt is made to select insects of a given age in this test. Test pots are prepared by reducing the number of nasturtium plants in 2½ inch culture pots until those remaining are infested with approximately 100 aphids. The infested test plants are treated with a formulation of the test chemical (2000 p.p.m. 1,7,13,19-eicosatetrayne—5% acetone—0.01% Triton X-155—balance water). Based on counts made 24 hours after exposure greater than 90% mortality is observed.

EXAMPLE 8

In order to evaluate systemic fungicidal activity, tomato plants, variety Bonny Best, growing in 4 inch pots are treated by pouring a test formulation (2000 p.p.m. product of Example 1—5% acetone—0.01% Triton X-155—balance water) on the soil in the pots at a rate equivalent to 128 lbs./acre (102 mg./pot.). The tomato plants are 3 to 4 inches tall and the trifoliant leaves are just starting to unfold at time of treatment. The tomato plants are exposed to the early blight fungus so that at the time of treatment, infection has occurred. After 10 to 14 days observation indicates greater than 45% disease control.

EXAMPLE 9

Spore germination tests on glass slides are conducted via the test tube dilution method adopted from the procedure recommended by the American Phytopathological Society's committee on standardization of fungicidal tests. In this procedure, the product of Example 2 in aqueous formulations at concentrations of 1000, 100, 10 and 1.0 p.p.m. is tested for its ability to inhibit germination of spores from 7 to 10 day old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Based on a rating system whereby the listed concentration affords disease control, the following compounds were rated according to their activity in this test:

TABLE II

| Compound | Fungi | |
| --- | --- | --- |
| | A. oleracea | M. fructicola |
| | P.p.m. | P.p.m. |
| 1,8-cyclotetradecatriyne (Product of Example 1) | 1,000 | 100-1,000 |
| 1,8,15-hexadecatriyne (Product of Example 2) | 10-100 | 100-1,000 |
| 1,7,13-tetradecatriyne (Product of Example 3) | 100-1,000 | 100-1,000 |
| 1,7,13,19-eicosatetrayne (Product of Example 3) | 100-1,000 | 1,000 |

EXAMPLE 10

A tomato foliage disease test is conducted measuring the ability of the product of Example 2 to protect tomato foliage against infection by the early blight fungus *Alternaria solani*. Tomato plants 5 to 7 inches high of the variety Bonny Best are employed. The plants are sprayed with 100 ml. of test formulation at 2000 p.p.m. (2000 p.p.m. product of Example 2—5% acetone—0.01% Triton X-155—balance water) at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants shows better than 75% disease control.

EXAMPLE 11

To evaluate bactericidal activity, the test chemical is mixed with distilled water containing 5% acetone and 0.01% Triton X-155, at a concentration of 250 p.p.m. 5 ml. of the test formulation are put in each of four test tubes. To each test tube is added one of the organisms: *Erwenia amylovora, Xanthomonas phaseoli, Staphylococcus aureus* and *Escherichia coli* in the form of a bacterial suspension in a saline solution from potatodextrose agar plates. The tubes are then incubated for 4 hours at 30° C. Transfers are then made to sterile broth with a standard 4 mm. loop and the thus-inoculated broth is incubated for 48 hours at 37° C. Using this procedure the products of Example 3 afford the noted bacterial control:

TABLE III

| Compound Tested | Percent Bacteria Control | | | |
|---|---|---|---|---|
| | E. amylovora | X. phaseoli | S. aureus | E. coli |
| 1,7,13-tetradecatriyne | 90 | 70 | 40 | 10 |
| 1,7,13,19-eicosatetrayne | 40 | 0 | 40 | 0 |

EXAMPLE 12

Seeds of green foxtail and lamb's quarters are treated in Petri dishes with aqueous suspensions of the test chemical at 1000 and 100 p.p.m. (1000 or 100 p.p.m./product of Example 3—5% acetone—0.01% Triton X–155—balance water). Lots of 25 seeds of each type are scattered in separate dishes containing filter paper discs moistened with 5 ml. of the test formulation at each concentration. After 7 to 10 days under controlled conditions, the test compound is given a rating which corresponds to the concentration that inhibits germination of half of the spores (ED 50) in the test or greater. Using this test, the following results are observed:

TABLE IV

| Compound Tested | Concentration inhibiting germination of half of the seeds | |
|---|---|---|
| | Lamb's Quarters, p.p.m. | Green Foxtail, p.p.m. |
| 1,7,13-tetradecatriyne | 100–1,000 | 100–1,000 |
| 1,7,13,19-eicosatetrayne | 1,000 | 100–1,000 |

EXAMPLE 13

To evaluate the effect of the compounds of this invention upon the germination of seeds in soil, a mixture of seed of six crop plants is broadcast in 8 x 8 x 2 inch metal cake pans filled to within ½ inch of the top with composted greenhouse soil. The seed is uniformly covered with about ¼ inch of soil and watered. After 24 hours, 80 ml. of an aqueous test formulation (320 mg. test chemical—5% acetone—0.01% Triton X–155—balance water) uniformly over the surface of the pan. This is equivalent to 64 lbs./acre. The seed mixture contains representatives of three broadleafs: turnip, flax, and alfalfa, and three grasses: whet, millet, and rye grass. Two weeks after treatment records are taken on seedling stand as compared to the controls. Using this procedure the following results are indicated:

TABLE V

| Compound | Percent Stand | |
|---|---|---|
| | Broadleaf Plants | Grass Plants |
| 1,7,13,19-eicosatetrayne (Product of Example 3) | 50 | 20 |
| 1,8,15-hexadecatriyne (Product of Example 2) | 90 | 40 |
| 1,7,13-tetradecatriyne | 10 | 5 |

EXAMPLE 14

To test herbicidal activity of the product of Example 1, tomato plants, variety Bonny Best, 5 to 7 inches tall; corn, variety Cornell M–1 (field corn), 4 to 6 inches tall; bean, variety Tendergreen, just as the trifoliate leaves are beginning to unfold; and oats, variety Clinton, 3 to 5 inches tall, are sprayed with an aqueous test formulation (6400 p.p.m. test chemical—5% acetone—0.01% Triton X–155—balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure the product of Example 1 receives ratings of 2, 3, 11, and 1, for the tomato, bean, corn and oat plants, respectively, thus demonstrating selective herbicidal activity.

EXAMPLE 15

In order to make an in vitro evaluation of the product of Example 2 as a contact poison, non-plant parasite nematodes (*Panagrellus redivivus*), are exposed to the test chemical in small watch glasses, (27 mm. diameter x 8 mm. deep), within a 9 cm. Petri dish. An aqueous test formulation (1000 p.p.m. test chemical—5% acetone —0.01% Triton X–155—balance water) is used. Results are recorded 24 hours after treatment and from these it is shown that the product of Example 2, i.e., 1,8,15-hexadecatriyne and one of the products of Example 3, i.e., 1,7,13-tetradecatriyne, cause 100% nematode control at the above concentration.

EXAMPLE 16

In order to demonstrate the effectiveness of a stabilizer of the present invention, a procedure is carried out by which alpha-chloro-p-xylene is stabilized with 1,8,15-hexadecatriyne. In this test 25 ml. of alpha-chloro-p-xylene is placed in each of six 4 ounce clear glass containers. 1,8,15-hexadecatriyne is added to the first five containers in concentrations of 0.0125 g., .025 g., .125 g., .250 g., and .500 g., respectively. A metal contaminant comprising 50% iron powder and 50% iron oxide is then added in concentrations of from 0.01 g. to 0.5 g. per container. A series of six solutions is made up in this manner, the last solution being employed as a standardized check. Each of these solutions is allowed to stand at room temperature for 9 days in the presence of ordinary room light whereupon each of the solutions is rated on a scale from 0 for colorless to 10 denoting complete decomposition and high discoloring. Employing this procedure, the standard check solutions were completely black receiving a rating of 10 at the end of the period employed, whereas the stabilized solutions were colorless, receiving a rating of 0. Thus demonstrating that 1,8,15-hexadecatriyne is singularly effective in the stabilization of alpha-chloro-p-xylene for a period of greater than 9 days under the conditions employed.

EXAMPLE 17

To further demonstrate the effectiveness of a combination of stabilizers of the present invention, a procedure is carried out by which alpha-chloro-p-xylene is stabilized with 1,8,15-hexadecatriyne and ethylene glycol. In this test 25 ml. of the alpha-chloro-p-xylene is placed in each of four 4 ounce clear glass containers. A combination of 0.0125 g. of 1,8,15-hexadecatriyne and 0.0125 g. of ethylene glycol is added to the first container. To the second a combination of 0.0625 g. of the triyne and 0.0625 g. of ethylene glycol is added and a combination of 0.125 g. of the triyne and 0.125 g. of ethylene glycol is added to the third, respectively. A metal contaminant comprising 50% iron powder and 50% iron oxide is then added in concentrations from about 0.01 g. to 0.5 g. per container. A series of four solutions is made up in this manner, the latter solution being employed as the standardized check. Each solution is allowed to stand at room temperature for 16 days in the presence of ordinary room light, whereupon each of these solutions is rated on a scale for 0 for colorless to 10 denoting complete decomposition and high discoloring. Employing this procedure the standard check solutions were completely black at the end of the period employed whereas the stabilized solutions were colorless, receiving a rating of 0. Thus demonstrating that the combination of 1,8,15-hexadecatriyne and ethylene glycol is synergistically effective, stabilizing alpha-chloro-p-xylene for a period of better than 15 days under the conditions employed.

EXAMPLE 18

A further demonstration of the effectiveness of the stabilizers of the present invention is carried out by stabilizing alpha-chloro-p-xylene with a combination of 1,8,15-hexadecatriyne and bis-(2-propynyl)-2,3,5,6-tetrachloroterephthalate.

Essentially the same stabilization procedure given in Example 16 is employed in this evaluation with the exception that a concentration of .0625 g. of the triyne in combination with .0625 g. of the alpha, omega diacetylenic ester is employed. This test indicates that at this concentration, the combination of the alpha, omega polyacetylenic hydrocarbon and the alpha, omega diacetylenic esters are effective as stabilizers for alpha-chloro-p-xylene for a period of at least three days.

EXAMPLE 19

Stabilizing effectiveness of the product of Example 1 is demonstrated by stabilizing benzyl chloride employing essentially the same test procedure given in Example 16. In this test the cyclic compound is completely ineffective in stabilizing alpha-chloro-p-xylene, but all the solutions of benzyl chloride are colorless after a period of greater than 15 days.

While there have been described various embodiments of the present invention, the method and products described are not intended to be understood as limiting the scope of the invention as it is realized that changes therein are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A stabilized composition of matter comprising essentially a side chain halogenated aromatic hydrocarbon selected from the group consisting of side-chain chlorinated xylene and benzyl chloride contaminated with metal ions and a stabilizing amount of a linear alpha, omega polyacetylenic hydrocarbon of the structure:

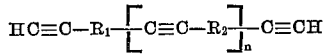

wherein $R_1$ and $R_2$ are alkylene radicals of greater than 4 carbon atoms, $n$ is a number from about 1 to 15.

2. A stabilized composition of matter comprising essentially a side chain halogenated aromatic hydrocarbon selected from the group consisting of side-chain chlorinated xylene and benzyl chloride and a stabilizing amount of a linear alpha, omega triacetylenic hydrocarbon represented by the structure:

wherein $R_7$ and $R_8$ are alkylene radicals having greater than 4 carbon atoms.

3. A stabilized composition of matter comprising essentially a side chain halogenated aromatic hydrocarbon selected from the group consisting of side-chain chlorinated xylene and benzyl chloride and a stabilizing amount of 1,8,15-hexadecatriyne.

4. The method of stabilizing a side chain halogenated aromatic hydrocarbon selected from the group consisting of side-chain chlorinated xylene and benzyl chloride comprising essentially contacting said halogenated aromatic hydrocarbon with an alpha, omega polyacetylenic hydrocarbon of the structure:

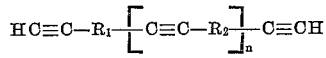

wherein $R_1$ and $R_2$ are alkylene radicals of greater than 4 carbon atoms, $n$ is a number from 1 to 15, inclusive.

5. The method of stabilizing a side-chain chlorinated xylene comprising essentially contacting said chlorinated xylene with a stabilizing amount of 1,8,15-hexadecatriyne.

6. The method of stabilizing benzyl chloride comprising essentially contacting said benzyl chloride with a stabilizing amount of 1,8-cyclotetradecadiyne.

7. The method of stabilizing benzyl chloride comprising essentially contacting benzyl chloride with a stabilizing amount of a cyclic acetylenic hydrocarbon represented by the structure

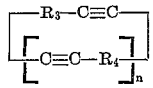

wherein $n$ is a number from about 1 to 15, $R_3$ and $R_4$ are alkylene radicals containing at least 5 carbon atoms.

8. A stabilized composition of matter comprising essentially a side-chain halogenated aromatic hydrocarbon selected from the group consisting of side-chain chlorinated xylene and benzyl chloride and a stabilizing amount of a linear alpha, omega-polyacetylenic hydrocarbon of the structure:

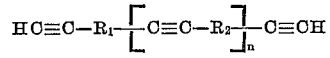

wherein $R_1$ and $R_2$ are alkylene radicals of greater than 4 carbon atoms, $n$ is a number from about 1 to 15, in combination with another stabilizer effective to minimize heat and light induced decomposition.

References Cited in the file of this patent

UNITED STATES PATENTS

| | | |
|---|---|---|
| 747,138 | Choulet | Dec. 15, 1903 |
| 1,097,145 | Snelling | May 19, 1914 |
| 2,047,874 | Kerns | July 14, 1936 |
| 2,435,887 | Hornbacher | Feb. 10, 1948 |
| 2,493,427 | Thomas | Jan. 3, 1950 |
| 2,596,929 | Kagy et al. | May 13, 1952 |
| 2,801,160 | Iserson | July 30, 1957 |
| 2,846,491 | Rutledge | Aug. 5, 1958 |
| 2,848,520 | Rutledge | Aug. 19, 1958 |
| 2,958,709 | Woltiz | Nov. 1, 1960 |